(12) United States Patent
Lewis

(10) Patent No.: US 8,292,627 B2
(45) Date of Patent: Oct. 23, 2012

(54) APPARATUS AND METHOD FOR DEVELOPING EMOTIONAL LITERACY

(75) Inventor: Marilyn Lewis, Odessa, FL (US)

(73) Assignee: Marilyn Lewis, Odessa, FL (US)

( * ) Notice: Subject to any disclaimer, the term of this patent is extended or adjusted under 35 U.S.C. 154(b) by 1158 days.

(21) Appl. No.: 12/077,786

(22) Filed: Mar. 22, 2008

(65) Prior Publication Data

US 2009/0239203 A1 Sep. 24, 2009

(51) Int. Cl.
*G09B 19/00* (2006.01)
(52) U.S. Cl. .......................................... 434/236
(58) Field of Classification Search ............... 434/127, 434/128, 236, 237, 238, 429, 430
See application file for complete search history.

(56) References Cited

U.S. PATENT DOCUMENTS

| | | | |
|---|---|---|---|
| 4,573,927 A | 3/1986 | Newman | |
| 5,040,988 A * | 8/1991 | Brown | 434/236 |
| 5,405,266 A | 4/1995 | Frank et al. | |
| 5,511,981 A * | 4/1996 | Olsen | 434/238 |
| 5,580,254 A | 12/1996 | Ramsey | |
| 5,676,584 A | 10/1997 | Perryman | |
| 5,741,137 A | 4/1998 | Aduvala | |
| 5,848,900 A | 12/1998 | Pearson | |
| 6,220,864 B1 * | 4/2001 | Walawender | 434/236 |
| 6,422,558 B1 * | 7/2002 | Chambers | 273/146 |
| 6,540,518 B1 * | 4/2003 | Shepherd | 434/236 |
| 6,994,555 B2 * | 2/2006 | Weiner et al. | 434/236 |
| 7,033,181 B1 * | 4/2006 | Bennett et al. | 434/236 |
| 7,182,601 B2 | 2/2007 | Donnan | |
| 8,007,280 B2 * | 8/2011 | Jokilehto | 434/128 |
| 2002/0009696 A1 * | 1/2002 | Lui et al. | 434/171 |
| 2005/0244798 A1 | 11/2005 | Zernzach | |

OTHER PUBLICATIONS

Committee for Children, Reinforce the Skills, available at http://www.cfchildren.org/support/skills/prekssp/ (1 pg)(viewed on Mar. 4, 2008).
Preschoolrock.com, Show Your Emotions Preschool Activity, available at http://www.activities.preschoolrock.com/ (1 pg)(viewed on Mar. 4, 2008).
Preschoolrock.com, Preschool Emotions Poster, available at http://www.activities.preschoolrock.com/ (1 pg)(viewed on Mar. 4, 2008).
American Psychological Association, Essentials for Success in Preschool and Beyond, available at http://www.apa.org/ppo/issues/pallen.html (2 pgs)(viewed on Mar. 4, 2008).
Articles for Educators, I Have Emotions—Preschool Activity and Emotions, available at http://www.articlesforeducators.com/ (1 pg)(viewed on Mar. 4, 2008).
University of Oklahoma Outreach, Southwest Prevention Center, Growing Up Strong, available at http://www.growingupstrong.org (3 pgs)(viewed on Mar. 4, 2008).

* cited by examiner

*Primary Examiner* — Kurt Fernstrom
(74) *Attorney, Agent, or Firm* — Law Office of Steven R. Olsen, PLLC; Steven R. Olsen

(57) ABSTRACT

Embodiments of the invention provide an apparatus and method for developing emotional literacy. Embodiments of the invention may be best suited for teaching preschool children, but the invention is not limited thereto. An embodiment of the invention provides an apparatus for teaching emotional literacy that includes: a first plurality of holding bins; a plurality of emotion cards; and a mirror disposed proximate to the first plurality of holding bins. Another embodiment of the invention provides a method for using the aforementioned apparatus that includes: observing the user depositing a selected one of the plurality of emotion cards into a selected one of the first plurality of holding bins; and discussing the expressed emotion with the user.

17 Claims, 5 Drawing Sheets

APPARATUS AND METHOD FOR DEVELOPING EMOTIONAL LITERACY

BACKGROUND AND SUMMARY

1. Field of the Invention

The invention relates generally to a teaching apparatus and method, and more particularly, but without limitation, to an apparatus and method for developing emotional literacy in preschool children.

2. Description of the Related Art

Emotional literacy is sometimes referred to as emotional intelligence or social-emotional competence. There is increasing recognition amongst academics and social scientists regarding the value in developing emotional literacy in children, especially during preschool education. There are many aspects to emotional literacy, including the ability of a person to recognize, articulate, and appropriately respond to, their own emotions and the emotions of another person.

One known method for developing and assessing emotional literacy in a child is to instruct the child to paint a self-portrait. Another known method involves a role-play activity, for instance where a child simulates social interactions using a doll.

Such methods have many practical disadvantages, however. One short-coming is that such methods may require a highly-trained teacher or other professional to interact with the child, for example to properly interpret a self-portrait, or to assess role-play scenes that are enacted with a doll. Thus, the requisite level of education and experience may exceed what can reasonably be expected from most preschool teachers. For at least this reason, known methods for improving emotional intelligence may be best suited for psychotherapeutic environments.

Another shortcoming of known methods is that they are not easily integrated into a daily preschool curriculum. For instance, a painting activity is typically performed separately from academic activities and requires a sizable unit of time. Accordingly, such an activity may only be performed on a sporadic and limited basis.

A method for developing emotional literacy that can be easily and continuously used in a preschool or home environment is urgently needed.

SUMMARY OF THE INVENTION

Embodiments of the invention provide an apparatus and method for developing emotional literacy. Embodiments of the invention may be best suited for teaching preschool children, but the invention is not limited thereto.

An embodiment of the invention provides an apparatus for teaching emotional literacy that includes: a first plurality of holding bins, each of the first plurality of holding bins including a first marking associated with a corresponding one of a plurality of emotions; a plurality of emotion cards, each of the first plurality of holding bins configured to hold at least one of the plurality of emotion cards, each of the plurality of emotion cards including a second marking associated with one of the plurality of emotions; and a mirror disposed proximate to the first plurality of holding bins such that when the apparatus is in use, the mirror is configured to allow a user to view a facial expression of the user.

Another embodiment of the invention provides a method for using the aforementioned apparatus. The method includes: observing the user depositing a selected one of the plurality of emotion cards into a selected one of the first plurality of holding bins to identify an expressed emotion, the expressed emotion being one of the plurality of emotions; and discussing the expressed emotion with the user.

Another embodiment of the invention provides a method for teaching emotional literacy that includes: leading a structured educational activity; inviting a child to express an emotion using an emotion activity apparatus, the emotion being one of the child's emotion, the child's perception of a fictional character's emotion, and an assigned emotion; observing an emotion indicated by the child; and logging the emotion indicated by the child.

BRIEF DESCRIPTION OF THE DRAWINGS

The present invention will be more fully understood from the detailed description below and the accompanying drawings, wherein.

DETAILED DESCRIPTION

Figure 1A:
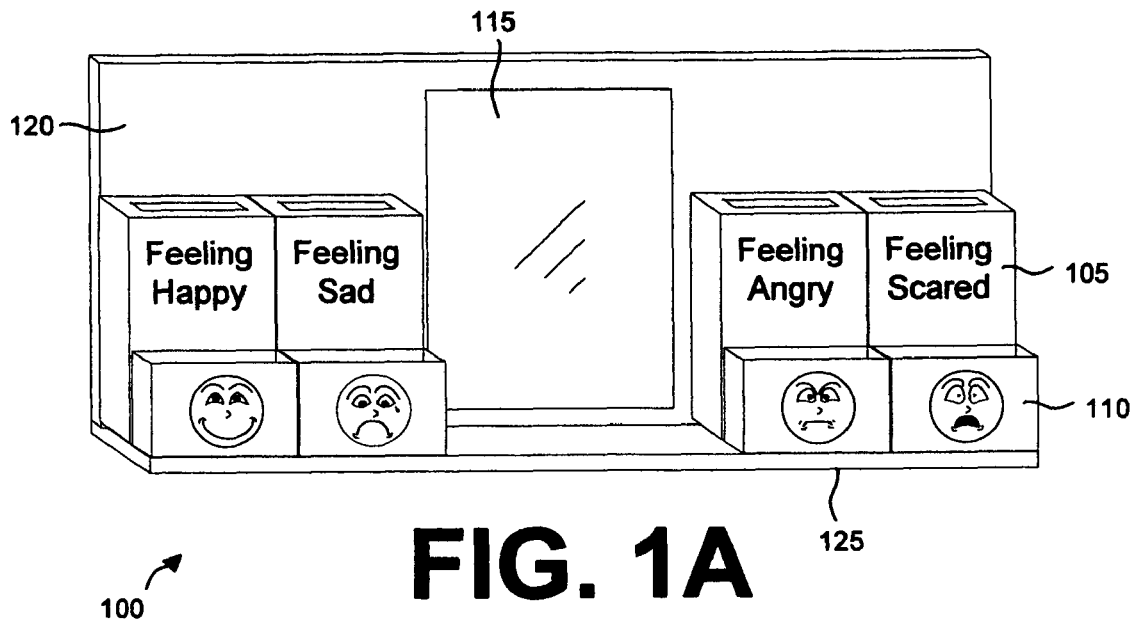
FIG. 1A is a perspective view drawing of an Emotion Activity Center, according to an embodiment of the invention.

Embodiments of the invention will now be described more fully with reference to FIGS. 1A through 6, in which embodiments of the invention are shown. This invention may, however, be embodied in many different forms and should not be construed as limited to the embodiments set forth herein. In the drawings, reference designators may be duplicated for the same or similar features.

FIG. 1A is a perspective view drawing of an Emotion Activity Center, according to an embodiment of the invention. As illustrated therein, an Emotion Activity Center 100 includes multiple Bins 105 and 110. Each of the multiple Bins 105 may be labeled with a textual expression of emotion. In the illustrated embodiment, each of the four bins 105 are labeled with one of "Feeling Happy," "Feeling Sad," "Feeling Angry," and "Feeling Scared." Each of the multiple Bins 110 may include an emoticon as described with reference to FIG. 2B below. The Emotion Activity Center 100 may also include a Mirror 115. In addition, the Emotion Activity Center 100 may include a base having a bottom portion 125 and a back portion 120. In the embodiment of FIG. 1A, each of the Bins 105 and 110 are attached to the bottom portion 125. In addition, each of the Bins 105 and the Mirror 115 are attached to the rear portion 120.

Variations to the illustrated Emotion Activity Center 100 are possible. For example, the number of Bins 105 and Bins 110 may vary, according to design choice. Preferably, the number of Bins 105 will be equal to the number of Bins 110. Although FIG. 1A illustrates that each of the Bins 110 may be smaller than each of the Bins 105, such size differences and proportions are not required. Additionally, in alternative embodiments, the Emotion Activity Center 100 does not include the Bins 110. Moreover, the Mirror 115 is an optional feature. Although it may be advantageous to include a mounting base, the bottom portion 125 and/or the rear portion 120 could be omitted, according to application demands. Thus, in an alternative embodiment, the Bins 105 and 110, and the Mirror 115, could be utilized as stand-alone components in proximity with each other, without being coupled to a common base.

Figure 1B:
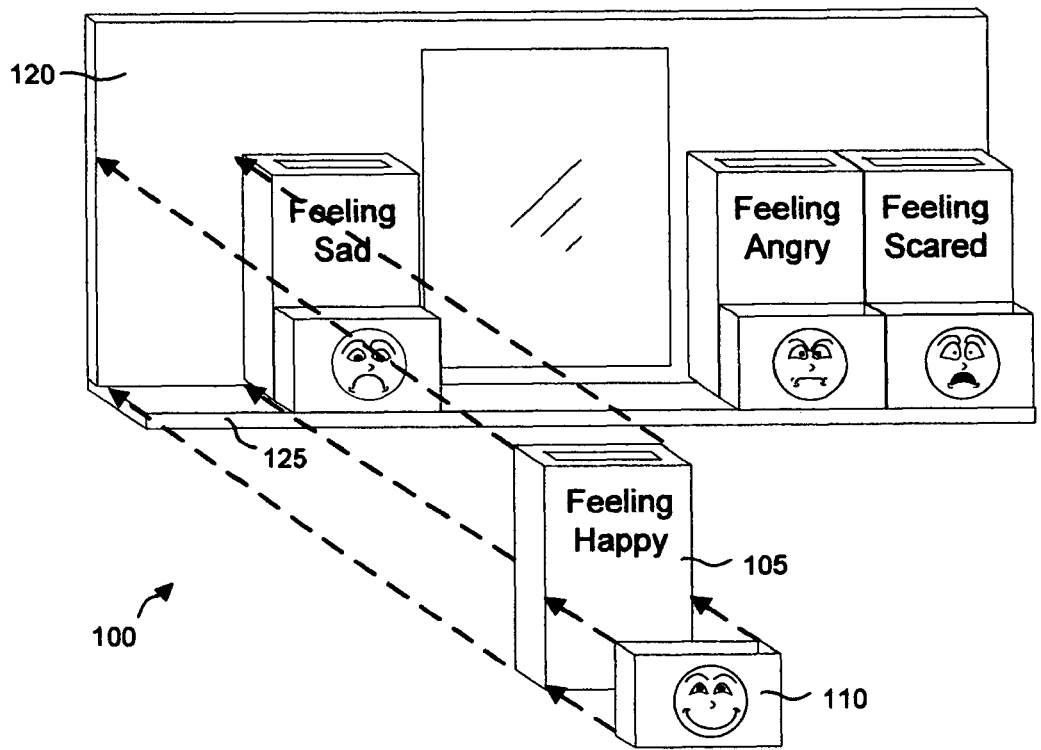
FIG. 1B is a partially-exploded perspective view drawing of an Emotion Activity Center, according to an embodiment of the invention.

FIG. 1B is a partially-exploded perspective view drawing of the Emotion Activity Center 100, according to an embodiment of the invention. As illustrated in FIG. 1B, each Bin 110 may be attached to a front surface of a corresponding Bin 105.

Figure 2A:
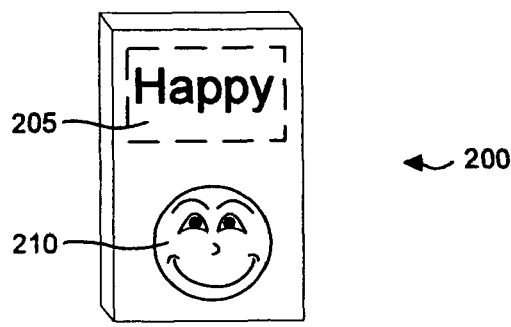
FIG. 2A is a perspective view drawing of an Emotion Card, according to an embodiment of the invention.

FIG. 2A is a perspective view drawing of a representative Emotion Card 200, according to an embodiment of the invention. The Emotion Card 200 may be the approximate scale of a rectangular playing card, and may be constructed of, for example, heavy paper, cardboard, plastic, or other suitable material. In the illustrated embodiment, the Emotion Card 200 includes a textual expression 205 of emotion, and an emoticon 210. As used herein, "emoticon" is the combination of the words "emotion" and "icon." Accordingly, an emoticon may be or include, for example, a facial expression that suggests a particular emotion. In the representative Emotion Card 200 illustrated in FIG. 2A, the emoticon 210 represents happiness. A complete set of Emotion Cards 200 may include one or more Emotion Cards 200 associated with each of several emotions. For example, a complete set of Emotion Cards 200 may include at least one Emotion Card 200 representative of happiness, at least one Emotion Card 200 representative of sadness, at least one Emotion Card 200 representative of anger, and at least one Emotion Card 200 representative of fright.

Variations to the Emotion Card 200 are possible. For example, the Emotion Card 200 may have a shape that is not rectangular. Moreover, the Emotion Card 200 may include just the textual expression 205, or just the emoticon 210. Where the Emotion Card 200 includes both the textual expression 205 and the emoticon 210, the textual expression 205 and the emoticon 210 preferably relate to the same emotion to build an association between them. In alternative embodiments, the emoticon 210 does not include a facial expression. For instance, the emoticon 210 could be a thumbs up or a thumbs down.

Figure 2B:
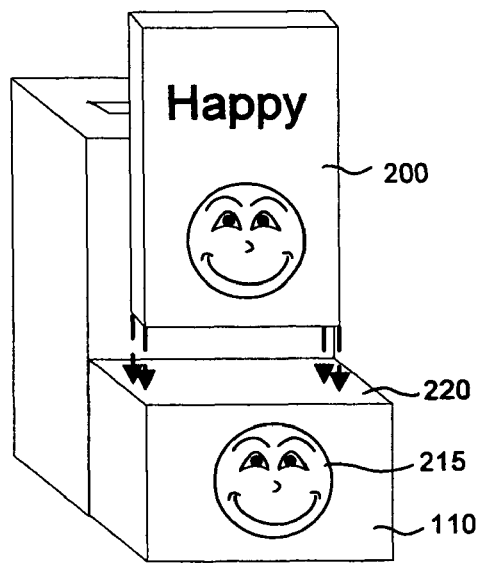
FIG. 2B is a perspective view drawing illustrating cooperation between a Bin 110 and the Emotion Card 200, according to an embodiment of the invention.

FIG. 2B is a perspective view drawing illustrating cooperation between a representative Bin 110 and the Emotion Card 200, according to an embodiment of the invention. The Bin 110 may be a hollow cuboid or other parallelepiped, although other geometric shapes could also be used. In the illustrated embodiment, the Bin 110 includes an Emoticon 215 on a front surface and further includes an open end 220. The Bin 110 is configured to receive one or more Emotion Cards 200 via the open end 220. In use, the Bin 110 is configured to store one or more Emotion Cards 200 for later use in the expression of an emotion. In the representative Bin 110 illustrated in FIG. 2B, the emoticon 215 represents happiness. A complete set of Bins 110 may include multiple bins, each bin being associated with one of several emotions. For example, a complete set of Bins 110 may include a bin representative of happiness, a bin representative of sadness, a bin representative of anger, and a bin representative of fright.

Figure 2C:
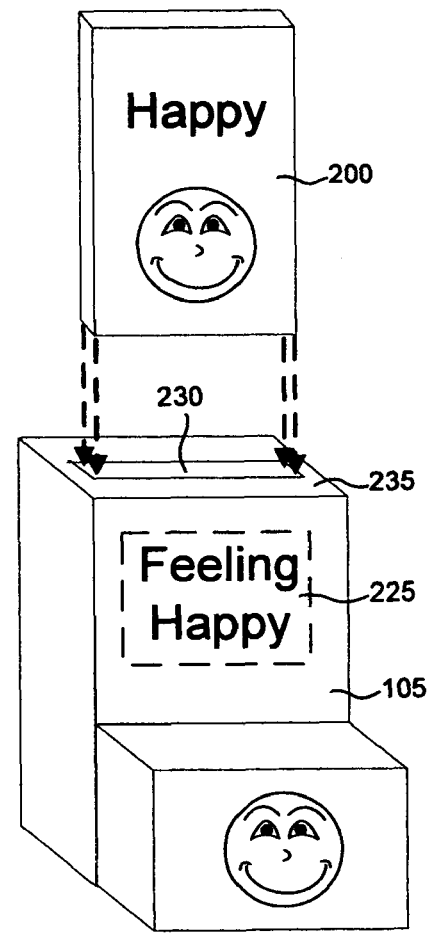
FIG. 2C is a perspective view drawing illustrating the cooperation between a Bin 105 and the Emotion Card 200, according to an embodiment of the invention.

FIG. 2C is a perspective view drawing illustrating the cooperation between a representative Bin 105 and the Emotion Card 200, according to an embodiment of the invention. The Bin 105 may be a hollow cuboid or other parallelepiped, although other geometric shapes could also be used. The Bin 105 includes a textual expression 225. The Bin 105 further includes a slotted opening 230 on a top side 235. The slotted opening 230 is configured to receive the Emotion Card 200. Preferably, the size of the slotted opening 230 in the top side 235 of the Bin 105 is configured to restrict access to the Emotion Card 200 after it has been placed in the Bin 105. In an alternative embodiment of the invention, the top side 235 could be open-ended. In the representative Bin 105 illustrated in FIG. 2B, the textual expression 225 relates to happiness. A complete set of Bins 105 may include multiple bins, each bin being associated with one of several emotions. For example, a complete set of Bins 105 may include a bin representative of happiness, a bin representative of sadness, a bin representative of anger, and a bin representative of fright.

With respect to FIGS. 1A, 1B, 2A, 2B, and 2C, it should be understood that, although they may be preferable, the happy, sad, angry and scared emotions are only representative of the emotions that could be associated with the Bins 105, the Bins 110, and the Emotion Cards 200. For instance, emotions such as mad, jealous, worried, frustrated, tired, embarrassed, surprised, loved, lonely, and proud could also be used, based on the age of the target student(s), local custom, or other considerations.

Preferably, the emoticons 210 and 215 that may be marked on the Emotion Cards 200 and Bins 110, respectively, include a color palate. For instance, the emoticon associated with Happy may be yellow, the emoticon associated with Sad may be blue, the emoticon associated with Angry may be red, and the emoticon associated with Scared may be purple.

Figure 3:
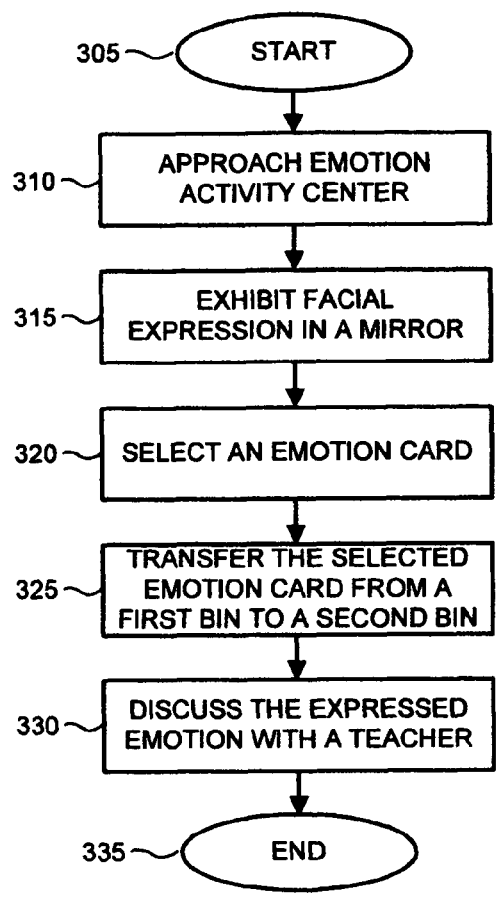
FIG. 3 is a flow diagram of a method for developing emotion literacy, according to an embodiment of the invention.

FIG. 3 is a flow diagram of a method for developing emotion literacy, according to an embodiment of the invention. The method illustrated in FIG. 3 is from the perspective of a child or other student. As illustrated therein, the process begins in step 305. Next, in step 310, the child approaches an Emotion Activity Center 100. In step 315, a child exhibits a facial expression in a Mirror 115. Then, in step 320, the child selects an Emotion Card 200 associated with the Emotion Activity Center 100. In step 325, the child transfers the selected Emotion Card 200 from a first Bin 110 to a second Bin 105 before terminating the process in step 330. Preferably, the facial expression in step 315, the Emotion Card 200 selected in step 320, and the first and second Bins 110 and 105 in step 325, all correspond to a single emotion, such as happiness. The process illustrated in FIG. 3 is applicable to a preschool or home environment, and may be repeated multiple times in a single day.

In one respect, the process in FIG. 3 enables a child to easily express an emotion by transferring an Emotion Card 200 from one bin to another. In another respect, the process in FIG. 3 teaches emotional literacy by allowing a child to associate different facial expressions seen in a Mirror 115 with different emotions. Moreover, the textual expression 205 on the Emotion Card 200 may be the same or similar to the textual expression 225 on the corresponding Bin 105. Likewise, the emoticon 210 on the Emotion Card 200 may be the same or similar to the emoticon 215 on the corresponding Bin 110. Thus, in another respect, the process in FIG. 3 teaches reading skills by building an association between the emoticons 210, 215 and the corresponding textual expressions 205, 225. Finally, the process in FIG. 3 enables a teacher to easily observe and interpret the child's expression of emotion.

Variations to the process illustrated in FIG. 3 are possible. For example, step 315 is optional. In addition, in embodiments of the invention, step 325 could be modified to include retrieving the Emotion Card 200 from a stack or other location, and depositing the Emotion Card 200 into a bin. In other words, the process could be adapted to use an Emotion Activity Center 100 that includes Bins 105 but that does not include Bins 110.

Figure 4:
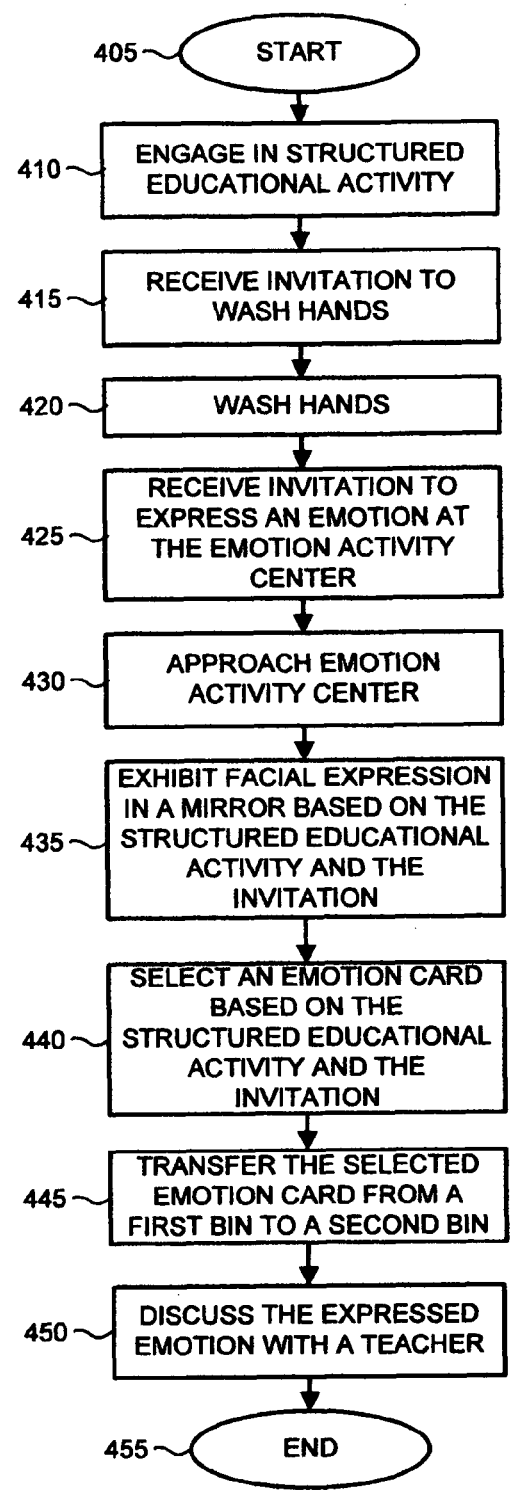
FIG. 4 is a flow diagram of a process for developing emotional literacy, according to an embodiment of the invention.

FIG. 4 is a flow diagram of a process for developing emotional literacy, according to an embodiment of the invention. The process in FIG. 4 is illustrated from the perspective of a child or other student. After beginning in step 405, the child may engage in a structured educational activity in step 410. The structured educational activity may be or include, for instance, hand washing, a story reading, a story discussion, a word wall activity, a story vocabulary activity, an audio activity, a video activity, a food activity, block play, dramatic play, a science activity, a language activity, or another educational activity. A child may then receive an invitation to wash their hands in step 415, and the child may in fact wash their hands in step 420. Next, in step 425, the child may receive an invitation to express an emotion at the Emotion Activity Center 100. The child may approach the Emotion Activity Center 100 in step 430 and exhibit a facial expression in the Mirror 115 based on the structured educational activity and the invitation. Next, in step 435, the child may select an Emotion Card 200 based on the structured educational activity and the invitation, and the child may further transfer the selected Emotion Card 200 from a first Bin 110 to a second Bin 105 in step 445 before terminating the process in step 450. The process illustrated in FIG. 4 may be repeated multiple times in a daily curriculum.

As illustrated in FIG. 4, the child may routinely develop personal hygiene skills (via steps 415 and 420) at the same time as the child is routinely developing his or her emotional literacy.

The emotions expressed by the child in steps 435, 440, and 445 may vary according to application of the illustrated process. In a first instance, the child may express his or her own emotion as a result of the structured educational activity and the invitation. For example, where the structured educational activity includes singing a song, and where the invitation received by the child in step 425 invites them to express their own feelings about the singing activity, the child may in fact perform steps 435, 440, and 445 based on their own feelings about the singing activity.

In another application of the process illustrated in FIG. 4, the child may express an emotion associated with someone other than themselves. For instance, where the structured educational activity involves a story activity, and where the invitation received by the child in step 425 invites the child to express an emotion of a character in the story, then the child may in fact perform steps 435, 440, and 445 based on the child's perception of the emotion of the character.

In yet another application of the process illustrated in FIG. 4, a child may express an emotion according to an assignment. For instance, where the structured educational activity introduces a child to an emotion, for example, anger, the child may receive an invitation in step 425 to express anger at the Emotion Activity Center 100. Accordingly, in this instance, the child may perform steps 435, 440 and 445 to indicate the assigned angry emotion.

Other variations to the process flow illustrated in FIG. 4 are possible. For example, the steps associated with hygiene, namely steps 415 and 420, are optional, according to design choice. Step 435 is also optional.

Figure 5:
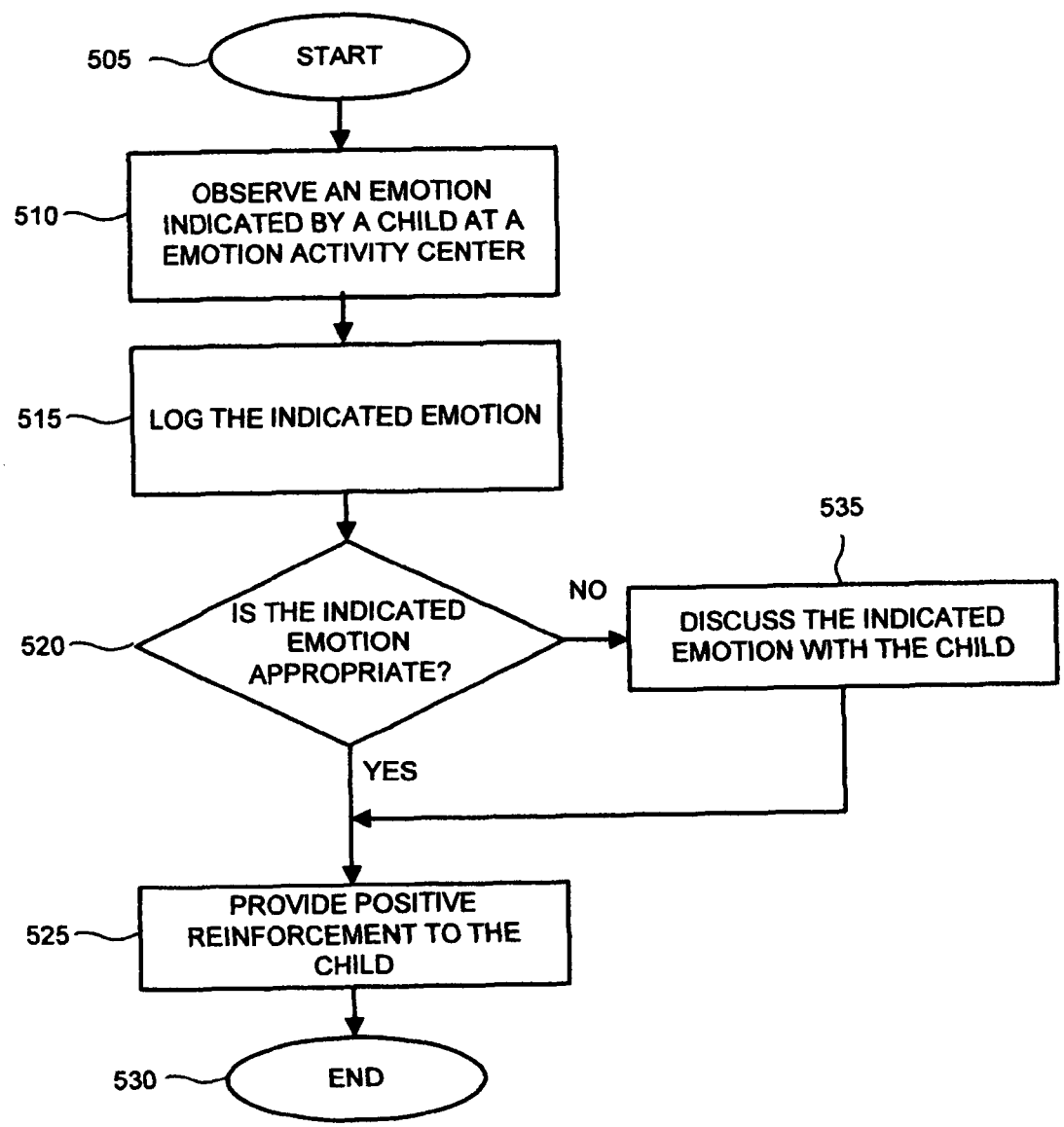
FIG. 5 is a flow diagram of a process for developing emotional literacy, according to an embodiment of the invention.

FIG. 5 is a flow diagram of a process for developing emotional literacy, according to an embodiment of the invention. FIG. 5 is illustrated from the perspective of a teacher. As shown therein, the process may begin in step 505, and a teacher may observe an emotion indicated by a child at an Emotion Activity Center 100 in step 510. Next, the teacher may log the indicated emotion in step 515. Such a log may include, for example, a notation of the date, the name of a child, the indicated emotion and/or any known activity (structured or otherwise) that is associated with the expression of emotion. Next, in conditional step 520, the teacher may determine whether the indicated emotion is appropriate. Where the result of conditional step 520 is in the affirmative, the teacher may then provide positive reinforcement to the child in step 525. For example, the teacher might acknowledge the child's indicated emotion by saying, "I feel happy, too." Subsequent to step 525, the process may terminate in step 530.

Where the teacher determines in conditional step 520 that the indicated emotion is not appropriate, then the teacher may discuss the indicated emotion with the child in step 535. For instance, the teacher may ask the child why he or she feels the way indicated. After the discussion, the teacher may provide positive reinforcement to the child in step 525, for example to reward the child for expressing his or her emotion, before the process terminates in step 530.

Variations to the process illustrated in FIG. 5 are possible. For instance, the logging step 515 may be omitted, according to design choice. In addition, the positive reinforcement step 525 is optional. Moreover, in an alternative embodiment, the teacher may discuss the indicated emotion with the child in step 535 in every instance, without the execution of conditional step 520.

Figure 6:
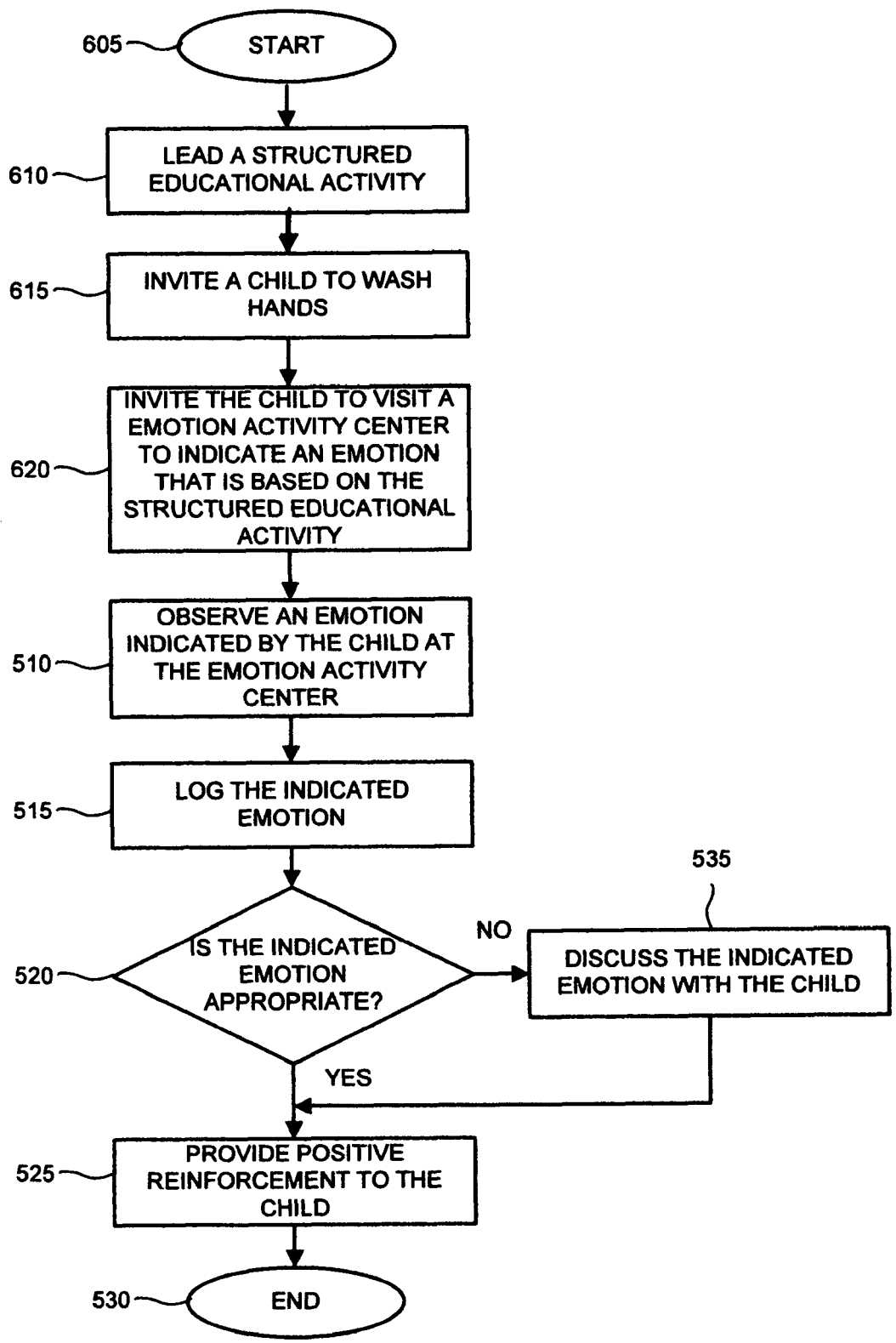
FIG. 6 is a flow diagram of a method for developing emotional literacy, according to an embodiment of the invention.

FIG. 6 is a flow diagram of a method for developing emotional literacy, according to an embodiment of the invention. The process in FIG. 6 is illustrated from the perspective of a teacher. As shown in FIG. 6, the process begins in step 605, and a teacher may lead a structured educational activity in step 610. The structured educational activity may be or include, for instance, hand washing, a story reading, a story discussion, a word wall activity, a story vocabulary activity, an audio activity, a video activity, a food activity, block play, dramatic play, a science activity, a language activity, or another educational activity. Next, the teacher may invite a child to wash their hands in step 615. In step 620, the teacher may invite the child to visit an Emotional Activity Center 100 to indicate an emotion that is based on the structured educational activity. A general description of steps 510, 515, 520, 525, 530, and 535 are omitted, since they are generally described above.

In different applications of the process illustrated in FIG. 6, the nature of the structured activity in step 610 and the invitation in step 620 may vary. In a first instance, a teacher may instruct a child to express his or her own emotion using the Emotion Activity Center 100. For example, the structured educational activity in step 610 may be a song; and, in step 620, the teacher may invite the child to express their own feelings about the singing activity.

In another application of the process illustrated in FIG. 6, the teacher may instruct a child to express an emotion associated with someone other than themselves. For instance, the structured educational activity in step 610 may be a story activity; and in step 620, the teacher may invite the child to express an emotion of a character in the story.

In yet another application of the process illustrated in FIG. 6, the teacher may instruct a child to express an assigned emotion. For instance, the structured educational activity may introduce a child to anger; and, in step 620, the teacher may invite the child to express anger at the Emotion Activity Center 100.

Other variations to the process flow illustrated in FIG. 6 are possible. For example, in alternative embodiments of the invention, step 615 may be omitted.

Although the processes in FIGS. 3-6 were described with respect to an Emotion Activity Center 100 and Emotion Cards 200, the processes do not necessarily require the Emotion Activity Center 100 and Emotion Cards 200 described with reference to FIGS. 1A, 1B, 2A, 2B, and 2C.

It will be apparent to those skilled in the art that modifications and variations can be made without deviating from the spirit or scope of the invention. For example, alternative features described herein could be combined in ways not explicitly illustrated or disclosed. Thus, it is intended that the present invention cover any such modifications and variations of this invention provided they come within the scope of the appended claims and their equivalents.

What is claimed is:

1. An apparatus for teaching emotional literacy, comprising:
    a first plurality of holding bins, each of the first plurality of holding bins including a first marking associated with a corresponding one of a plurality of emotions;
    a plurality of emotion cards, each of the first plurality of holding bins configured to hold at least one of the plurality of emotion cards, each of the plurality of emotion cards including a second marking associated with one of the plurality of emotions; and
    a mirror disposed proximate to the first plurality of holding bins such that when the apparatus is in use, the apparatus is configured to allow a user to compare a facial expression of the user to the first marking of each of the first plurality of holding bins without repositioning the apparatus with respect to the user.

2. The apparatus of claim 1, wherein the first marking includes text associated with the corresponding one of the plurality of emotions.

3. The apparatus of claim 1, wherein the second marking includes text associated with the corresponding one of the plurality of emotions.

4. The apparatus of claim 3, wherein the second marking includes an emoticon associated with the corresponding one of the plurality of emotions.

5. The apparatus of claim 1, wherein the second marking includes an emoticon associated with the corresponding one of the plurality of emotions.

6. The apparatus of claim 1, wherein the plurality of emotions includes happy, sad, angry and scared.

7. The apparatus of claim 1, wherein the plurality of emotions are selected from the group consisting of happy, sad, angry, scared, mad, jealous, worried, frustrated, tired, embarrassed, surprised, loved, lonely, and proud.

8. The apparatus of claim 1, further comprising a second plurality of holding bins, each of the second plurality of holding bins including a third marking associated with a corresponding one of the plurality of emotions, each of the second plurality of holding bins configured to hold at least one of the plurality of emotion cards.

9. The apparatus of claim 8, wherein the third marking includes an emoticon associated with the corresponding one of the plurality of emotions.

10. The apparatus of claim 8, further including a base coupled to each of the first plurality of holding bins, the mirror, and each of the second plurality of holding bins.

11. The apparatus of claim 1, further including a base coupled to each of the first plurality of holding bins and the mirror.

12. A method for using the apparatus of claim 1, the method comprising:
    observing the user depositing a selected one of the plurality of emotion cards into a selected one of the first plurality of holding bins to identify an expressed emotion, the expressed emotion being one of the plurality of emotions; and
    discussing the expressed emotion with the user.

13. The method of claim 12, further comprising:
    after the observing, logging the user name and the expressed emotion.

14. The method of claim 12, further comprising, before the observing:
    leading the user in an educational activity; and
    inviting the user to express a particular emotion using the apparatus, the particular emotion being one of the plurality of emotions.

15. The method of claim 14, wherein the particular emotion is based on how the user feels after the educational activity.

16. The method of claim 14, wherein leading the user in the educational activity includes reading a story, and wherein the particular emotion is based on the user's perception of an emotional state of a character in the story.

17. The method of claim 14, wherein leading the user in the educational activity includes discussing the particular emotion.

* * * * *